UNITED STATES PATENT OFFICE.

RUDOLF WEEBER, OF VIENNA, AUSTRIA-HUNGARY.

PROCESS FOR THE PRODUCTION OF A LEATHER SUBSTITUTE.

No. 927,198.        Specification of Letters Patent.        Patented July 6, 1909.

Application filed July 23, 1907. Serial No. 385,222.

*To all whom it may concern:*

Be it known that I, RUDOLF WEEBER, a subject of the Emperor of Austria-Hungary, residing at Vienna, in the Empire of Austria-Hungary, have invented certain new and useful Improvements in and Relating to Processes for the Production of a Leather Substitute, of which the following is a specification.

My invention is an improvement in a proccess for the production of a leather substitute and consists in certain novel steps hereinafter described and claimed.

The invention consists essentially in treating vegetables or other fibers, with a solution of india rubber, gutta-percha, or a mixture of these substances or a solution of cellulose of any kind such for instance as nitro cellulose, cellulose xanthogenate or with a solution of animal or vegetable albumen casein, or with a solution of gelatin or the like or oil, caoutchouc or balata and subsequently treating with re-agents which precipitate these materials. The product thus obtained is then passed through suitable pressing apparatus such as pressure rollers, calendering machines or the like and dried. Oils, soft resins, glycerin, paraffin, train oil, or the like may be added, in order to increase the softness and flexibility of the final product. Tar, asphalt or the like may be also added to soften the product. For rubber or gutta-percha solutions which have benzin as the solvent, acetone is a suitable precipitant. When bisulfid of carbon or benzol is the solvent alcohol is a suitable precipitant, and with tetraclorid of carbon as the solvent methylalcohol may be used as the precipitant.

For a solvent of nitro cellulose or celluloid, any ether-alcohol or acetone and alcohol, petroleum-ether or benzol may be used as the precipitant. In either case the precipitant used must separate the precipital in the colloidal and not in the flocculent.

The vegetable fibers may also be first treated with the precipitant and afterward with the binding solution.

The process may be also carried out by first treating the fibrous materials with a rubber solution precipitating the rubber, and drying and pressing the precipitate after which the solution so obtained is treated with a solution of cellulose and the cellulose is precipitated or the process may be reversed. The last precipitate thus obtained is then passed through suitable pressure devices and then dried.

The product obtained by the process resembles leather very closely, being flexible, extensible and possesses a high degree of strength and the other physical products of leather, so that it may be used as a complete substitute for that material.

In order to increase still further the strength and uniformity of the product, it can be mercerized preferably by the use of caustic soda solutions. Further if the material has been treated with india rubber or gutta-percha, it can be vulcanized in the usual manner in order to increase its strength and this may be done either before or after the mercerizing. The finished product may also if desired be coated on one or both sides with india rubber, celluloid, nitro-cellulose, and viscose, albumen or the like, and it may be colored by the addition of suitable coloring material during the production.

The process above described consists in the following steps. Treating fibers either vegetable or animal with a solution of india rubber, gutta-percha or the like, by placing the fibers in the solution, and adding a reagent to precipitate the rubber or gutta-percha from their solvent upon the fibers, for the purpose of uniformly impregnating the fiber with the precipitated substances, and afterward drying and pressing the fibers and the precipitate thereon to form a sheet. The solvent may be recovered and re-used.

I claim:

1. A process for producing a leather substitute, which consists in adding fibrous material to a solution of balata, caoutchouc and gutta-percha, precipitating the agglutinant on to the fibrous material, separating the fibrous material from the solution, adding an oil to make the fibrous material soft and flexible, and forming said material into a sheet.

2. The process for producing a leather substitute, which consists in adding fibrous material to a solution of an agglutinant, precipitating the agglutinant from the solution on to the fibrous material, separating the fibrous material from the solution, adding an oil to make the fibrous material soft and flexible, and forming said material into a sheet.

In testimony that I claim the foregoing I have hereunto set my hand this sixth day of July 1907.

RUDOLF WEEBER.

Witnesses:
 HARRY BELMONT,
 ROBT. W. HEINGARTNER.